United States Patent [19]

Danner

[11] Patent Number: 5,389,136
[45] Date of Patent: Feb. 14, 1995

[54] WAX DISPERSIONS, THEIR PRODUCTION AND USE

[75] Inventor: Bernard Danner, Riedisheim, France

[73] Assignee: Sandoz Ltd., Basel, Switzerland

[21] Appl. No.: 25,206

[22] Filed: Mar. 2, 1993

[30] Foreign Application Priority Data

Mar. 4, 1992 [DE] Germany .............................. 4206714

[51] Int. Cl.⁶ ............................................. C09D 191/06
[52] U.S. Cl. ...................................... 106/271; 8/115.51; 8/115.6; 8/128.1; 208/21; 252/8.6; 252/8.8
[58] Field of Search ................. 106/271; 252/8.6, 8.8; 8/115.51, 115.6, 128.1; 208/21

[56] References Cited

U.S. PATENT DOCUMENTS

| | | | |
|---|---|---|---|
| 2,954,337 | 9/1960 | Martin | 106/271 |
| 3,155,537 | 11/1964 | Patterson | 117/138.8 |
| 3,386,938 | 6/1968 | Finch | 260/28.5 |
| 3,560,382 | 2/1971 | Finch | 252/8.9 |
| 4,001,285 | 1/1977 | Hochreuter | 260/401 |
| 4,149,978 | 4/1979 | Goffinet | 252/8.8 |
| 4,329,390 | 5/1982 | Danner | 428/264 |
| 4,339,276 | 7/1982 | Yokoyama et al. | 106/271 |
| 4,619,703 | 10/1986 | Gerber et al. | 106/271 |
| 5,028,265 | 7/1991 | Schmidt-Thuemmes et al. | 106/271 |

FOREIGN PATENT DOCUMENTS

| | | | |
|---|---|---|---|
| 0416917 | 3/1991 | European Pat. Off. | |
| 0451352 | 10/1991 | European Pat. Off. | |
| 2646424 | 8/1990 | France | |
| 1469457 | 1/1969 | Germany | |
| 2236273 | 2/1973 | Germany | |
| 2830173 | 1/1979 | Germany | |
| 2757916 | 7/1979 | Germany | |
| 3334575 | 4/1984 | Germany | |
| 0217817 | 1/1985 | Germany | 106/271 |
| 3003851 | 8/1990 | Germany | |
| 7117367 | 6/1972 | Netherlands | 106/271 |
| 1055344 | 1/1967 | United Kingdom | |
| 1212530 | 11/1970 | United Kingdom | 106/271 |
| 2128202 | 4/1984 | United Kingdom | 106/271 |

OTHER PUBLICATIONS

Derwent Abstracts: *Patent Abstracts of Japan*, 1-96247 A., C-618; 17 Jul. 1989, vol. 13/No. 313.
Derwent Abstracts: *Patent Abstracts of Japan*, 2-251676 A., C-791, 21 Dec. 1990, vol. 14/No. 578 and published Abstract (® Derwent Publications Ltd.).
Derwent Abstracts: *Patent Abstracts of Japan*, 3-97969 A., C-850; 17 Jul. 1991, vol. 15, No. 282.
Derwent Abstracts: DE 2757916, FR 2642424, DE 2236273, GB 1055344, DE 1469457, EP 451352, DE 2830173, DE 3334575, DE 3003851 no date.
Search Report, Deutsches Patentamt, (dated Jun. 10, 1993) for application DE P 4206714.6.
Search Report, PCT/International Search Report, (dated 27 May 1993) for application PCT/CH93/00050.

*Primary Examiner*—Anthony Green
*Attorney, Agent, or Firm*—Robert S. Honor; Richard E. Vila; Andrew N. Parfomak

[57] ABSTRACT

Aqueous wax dispersions (G) comprising (A) a wax mixture of ($A_1$) at least one non-oxidized paraffin wax with needle penetration (according to ASTM-D 1321)$\leq$20 dmm and melting range above 65° C.

and ($A_2$) at least one oxidized hydrocarbon wax with needle penetration (according to ASTM-D 1321)$\leq$4 dmm and optionally ($A_3$) at least one non-oxidized paraffin wax with needle penetration (according to ASTM-D 1321)$\leq$55 dmm and melting range below or up to 65° C.

and/or ($A_4$) at least one cationically modified oxidized hydrocarbon wax and (B) a cationic dispersant system and optionally (C) at least one softening and/or antistatic adjuvant and/or (D) a preserving agent or/and a defoamer. and/or (E) at least one amphoteric surfactant, are eminently suitable as finishing agents, in particular for yarns, in order to provide good slippage properties to the yarns finished therewith.

22 Claims, No Drawings

WAX DISPERSIONS, THEIR PRODUCTION AND USE

In the mechanical processing of fibres, principally of yarns, especially of those that in the course of their production have been chemically treated (e.g. bleached, dyed and/or optically brightened), in high-speed processing machines, e.g. for winding (especially winding, re-winding and package-winding), weaving, knitting, embroidering etc., the yarns are exposed during yarn conveyance through the various parts of the apparatus to high dynamic frictions, which may lead to damages of the fibre and even up to yarn rupture (by the continuous friction of the yarns on the yarn guide rings there may e.g. even be formed a groove in these rings, by which the damages caused by friction at the high-speed conveyed fibres or yarns, which are guided through these rings, are increased resp. multiplied correspondingly). Therefore in such cases the yarns, or the fibres for their production, are treated with adjuvants in order to increase the yarns slippage respectively in order to reduce the friction against parts of the apparatus and also to each other. In such fibre or yarn treatment agents (fibre or yarn finishes) it is desired that they should cause as great a reduction of the dynamic friction as possible and that their permanence on the fibre be such that during the whole course of the mechanical processing of the yarn the efficiency is maintained and that the product is not sheared-off or rubbed-off on the yarn guide elements of the machine and further that the soft handle of the goods is not impaired by the finishing but on the contrary be improved if possible.

It has now been found that the wax dispersions (G) described below, which comprise a substantial amount of waxes $(A_1)$, $(A_2)$ of high hardness as defined below and are dispersed with a cationic dispersant system, are surprisingly well suitable as yarn finishing agents of excellent slippage efficiency and mechanical permanence and for the achievement of a pleasant soft handle.

The invention relates to the corresponding aqueous wax dispersions, their production and their use as finishing agents, in particular as yarn finishing agents.

The invention thus provides an aqueous wax dispersion (G) comprising (A) a wax mixture of $(A_1)$ at least one non-oxidized paraffin wax with needle penetration (according to ASTM-D 1321)$\leq 20$ dmm and melting range above 65° C.
and $(A_2)$ at least one oxidized hydrocarbon wax with needle penetration (according to ASTM-D 1321)$\leq 4$ dmm
and optionally $(A_3)$ at least one non-oxidized paraffin wax with needle penetration (according to ASTM-D 1321)$\leq 55$ dmm and melting range below or up to 65° C.
and/or $(A_4)$ at least one cationically modified oxidized hydrocarbon wax and (B) a cationic dispersant system.

As waxes $(A_1)$, $(A_2)$, $(A_3)$ and $(A_4)$ there may in general be employed in each case known waxes.

The paraffin waxes $(A_1)$ and $(A_3)$ are essentially practically pure hydrocarbons as may in particular be obtained from the petroleum processing and may in particular be macrocrystalline, finecrystalline, malcrystalline or microcrystalline; they may be characterized by their needle-penetration and melting range.

As paraffin waxes $(A_1)$ are preferred those whose melting range is within the temperature range of from 65° to 110° C., in particular 80° to 105° C., and whose needle penetration according to ASTM-D 1321 is in the range of 1 to 16, preferably 5 to 16 dmm. Advantageously the paraffin waxes $(A_1)$ are substantially free of oils (the oil content is preferably $\leq 0.5\%$ by weight) and preferably also substantially free of aromatics. Preferably as $(A_1)$ there are employed so-called hard paraffins, in particular non-oxidized microcrystalline waxes.

The oxidized hydrocarbon waxes $(A_2)$ and those employed as starting materials for the cationic modification $(A_4)$ are in general carboxy group-containing oxidized and optionally partially saponified hydrocabon waxes and include in general any synthetic and/or mineral waxes that in the oxidized form have still a wax structure, in particular oxidized microwaxes or oxidized polyolefin waxes (principally polyethylene waxes) or further waxes that are optionally directly synthetized in the oxidized form, especially Fischer-Tropsch waxes and also their oxidation waxes, and where the mentioned oxidized waxes, especially the oxidized polyolefine waxes and Fischer-Tropsch waxes, may optionally be partially saponified. Among the mentioned waxes the oxidized and optionally partially saponified microwaxes, Fischer-Tropsch waxes and polyethylene waxes are preferred. Such waxes are in general known and may be characterized by conventional parameters, such as needle penetration (e.g. by ASTM D-1321), the solidification point and/or dripping point, the acid number and in case also the saponification number.

As waxes $(A_2)$ come advantageously into consideration oxidized microwaxes, partially saponified Fischer-Tropsch waxes or oxidized and optionally partially saponified polyethylene waxes, whose melting range is preferably in the temperature range of from 75° to 120° C., in particular 80° to 120° C., and whose acid number is advantageously in the range of 8 to 55, preferably 10 to 35. The saponification number is advantageously in the range of from 18 to 65, preferably 20 to 55. Among the oxidized microwaxes are preferred those whose melting range is within the temperature range of 90° to 120° C. Among the oxidized, optionally partially saponified polyethylene waxes are preferred those with a melting range within the temperature range of 100° to 120° C., in particular those with a density in the range of 0.93 to 0.98. Among the Fischer-Tropsch waxes, especially the partially saponified Fischer-Tropsch waxes, are preferred those whose melting range is in the temperature range of from 80° to 120° C. Among the mentioned waxes are preferred in particular the partially saponified (optionally oxidized) Fischer-Tropsch waxes.

In the mixture of $(A_1)$ and $(A_2)$ $(A_1)$ represents advantageously at least one half, $(A_1)$ preferably outweighing $(A_2)$. The weight ratio $(A_2)/(A_1)$ is advantageously in the range of from 1/12 to 1/1, preferably in the range of 1/10 to 1/1.5, in particular in the range of 1/5 to 1/1.7.

The wax mixtures (A) may consist solely of $(A_1)$ and $(A_2)$; alternatively they may also advantageously comprise the above-mentioned waxes $(A_3)$. The melting range of the paraffin waxes $(A_3)$ is advantageously above 30° C., preferably within the temperature range of 45° to 65° C., the solidification point of $(A_3)$ being advantageously by at least 10° centigrade, preferably by at least 20° centigrade, lower than the one of (A₁) respectively the dripping point of (A₃) advantageously being by at least 10° centigrade, preferably by at least 20° centigrade, lower than the one of (A₁). The needle penetration of (A₃) according to ASTM-D 1321 is advantageously in the range of 10 to 45 dmm. As (A₃) come especially into consideration macrocrystalline paraffin waxes; their oil-content may e.g. be up to 10% by weight, advantageously ≦5%. Particularly preferred as (A₃) are the refined paraffin waxes with an oil content ≦0.5%. Also (A₃) is preferably essentially free of aromatics.

The proportion of wax (A₃) in the mixture of (A₁), (A₂) and (A₃) may be relatively high, it amounts, however, advantageously to not more than ⅔ of this mixture. Advantageously the weight ratio [(A₁)+(A₂)]/(A₃) is in the range of ⅓ to 10/1, preferably in the range of 1/1 to 4/1.

According to a particular feature of the invention a modified wax (A₄) may be added to the wax mixture of (A₁) and (A₂) or also to the wax mixture of (A₁), (A₂) and (A₃).

Whilst the waxes (A₂), besides the introduction of oxygen in their production and optionally a partial saponification, are otherwise essentially not further chemically modified, as waxes (A₄) come into consideration such waxes that are cationically modified, preferably by reaction with polyamines. The waxes (A₄) are advantageously such that are amidated by reaction of an optionally partially saponified Fischer-Tropsch wax, an oxidized polyethylene wax or an oxidized microwax, with needle penetration (according to ASTM-D 1321) ≦20 dmm, dripping point ≦80° C. and acid number in the range of 5 to 80, with a polyamine containing only one primary amino group and are preferably quaternated. The oxidized hydrocarbon waxes employed for the production (A₄) are preferably such whose dripping point is < 140° C. and is preferably in the temperature range of from 85° to 130° C., whose needle penetration is preferably in the range of 1 to 10 dmm and whose acid number is preferably in the range of 10 to 60; the saponification number is advantageously in the range of 10 to 120, preferably in the range of 20 to 80. These waxes are advantageously cationically modified by reaction with polyamines that contain only one primary amino group, while the other are secondary or preferably tertiary; preferably these polyamines are aliphatic and/or aromatic diamines of the formula $$H_2N-W-NRR_o \qquad (II)$$

wherein W signifies a bivalent hydrocarbon radical with 2 to 8 carbon atoms,

R signifies hydrogen, $C_{1-24}$-alkyl, $C_{14-24}$-alkenyl or $C_{2-4}$-hydroxyalkyl and $R_o$ signifies hydrogen, $C_{1-4}$-alkyl, $C_{2-4}$-hydroxyalkyl or benzyl, at most one of R and $R_o$ signifying hydrogen, or R and $R_o$ together with the nitrogen atom to which they are bound signify a morpholino ring.

As W, which may be aromatic araliphatic or preferably aliphatic, come principally into consideration propylene-1,3 and ethylene, especially propylene-1,3. R may represent the alkyl radical of a higher saturated fatty amine or the alkenyl radical of a higher unsaturated fatty amine, e.g. with 12 to 24 carbon atoms. As hydroxyalkyl radicals in the significances of R and $R_o$ come principally into consideration 2-hydroxypropyl and 2-hydroxyethyl. With particular preference the symbols R and $R_o$ represent lower alkyl radicals with 1 to 4 carbon atoms, in particular ethyl or methyl. The amidation of the oxidized waxes with the mentioned monoprimary polyamines takes place advantageously to such a degree that the original acid number is diminished by at least 50%; preferably the acid number of the amidated wax amounts to values that are ≦20% of the original acid number of the carboxy group-containing oxidized and optionally partially saponified wax. The so amidated waxes are advantageously also quaternized, whereby in the quaternization there may be introduced conventional low molecular radicals, e.g. benzyl, β-hydroxyethyl or $C_{1-4}$-alkyl, preferably ethyl or methyl. The quaternization is preferably carried out to such a degree that the available aminoamide groups are quaternized to a major proportion, with particular preference so that practically all quaternizable aminoamide groups are quaternized. The mentioned quaternized waxes are known and are described e.g. in the German laid-open patent application DE 36 21 345 A1 (corresponding to U.S. Pat. Nos. 4,743,660 and 4,885,325), the content of which is incorporated herein by reference.

If (A₄) is present it is expediently present in minor amounts, viz. its amount is advantageously a fraction of the quantity of (A₁) and is preferably also smaller than the quantity of (A₂). If (A₄) is present, the weight ratio (A₄)/(A₁) is advantageously in the range of 0.5/100 to 40/100, preferably in the range of 1/100 to 30/100. The weight ratio (A₄)/(A₂) is preferably ≦0.5.

For the production of aqueous wax dispersions (G) the wax mixtures (A) are dispersed in water with the aid of a cationic dispersant system (B). The cationic dispersant system (B) is characterized by a content of at least one cationactive surfactant and contains advantageously, besides the cationactive surfactant which preferably is clearly cationic, at least one non-ionic and/or weakly cationactive surfactant.

(B) is advantageously a mixture of the following surfactants (B₁) and (B₂):

(B₁) at least one non-ionic or weakly cationic dispersant and (B₂) at least one cationic surfactant of the formula $$R'\!-\!\!\left[\!-X-\underset{\underset{R_3}{|}}{\overset{(R_4)_p}{\overset{|}{N^{p+}}}}\!-\!\right]_m\!\!-\!R'' \quad nA^-, \qquad (I)$$

wherein R' signifies a radical of the formula $$R_1-CO-NH- \qquad (\alpha)$$

or $$R_2-\underset{\underset{R_3}{|}}{\overset{(R_4)_p}{\overset{|}{N^{p+}}}}-, \qquad (\beta)$$

R'' signifies $R_5$ or $-X-R'$, $R_1-CO-$ signifies the acyl radical of a $C_{10-24}$-fatty acid, $R_2$ signifies an aliphatic $C_{10-24}$-hydrocarbon radical, $R_3$ signifies hydrogen, $C_{1-4}$-alkyl, benzyl, $-Y-OH$ or $-Z-CO-NH_2$, $R_4$ signifies $C_{1-4}$-alkyl or benzyl, $R_5$ signifies hydrogen, $C_{1-4}$-alkyl, benzyl, —Y—OH or
—$Z_{13}$ CO—NH$_2$, X signifies $C_{2-6}$-alkylene, Y signifies $C_{2-4}$-alkylene or styrene, Z signifies $C_{1-3}$-alkylene, each of the indexes p, independently from each other, signifies 0 or 1, m signifies a number from 0 to 2 if R' signifies a radical of formula ($\beta$), or from 1 to 2 if R' signifies a radical of formula ($\alpha$), A$^-$ signifies an equivalent of an anion and n signifies the total number of positive charges in (B$_2$), and which, if at least one of the indexes p=0, is optionally protonated.

The surfactants (B$_1$) are essentially such with emulsifier resp. dispersant character. Emulsifiers resp. dispersants with non-ionogenic resp. weakly cationactive character are known in large number in technique and are also described as such in the specialized literature, thus e.g. in M.J. SCHICK "Non-ionic Surfactants" (volume 1 of "Surfactants Science Series" Marcel DECKER Inc., New-York, 1967). Suitable non-ionogenic or weakly cationactive dispersants, in particular emulsifiers (B$_1$), are principally oxyalkylation products of fatty alcohols, fatty acids, fatty amines, fatty acid mono- or dialkanolamides (wherein "alkanol" stands especially for "ethanol" or "isopropanol") or of fatty acid partial esters of tri- to hexafunctional aliphatic polyols, in which as oxyalkylation agents come into consideration $C_{2-4}$-alkyleneoxides and optionally styreneoxide and at least 50% of the introduced oxyalkyl units are oxyethyl units. Advantageously at least 80% of the introduced units are oxyethyl units; the simplest all of the introduced oxyalkyl units are oxyethyl units. The starting products for the addition of the oxyalkyl units (fatty acids, fatty acid mono- or dialkanolamides, fatty alcohols, fatty amines or fatty acid polyol partial esters) may be any conventional products as are employed for the production of such surfactants, principally such with 12 to 24 carbon atoms in the fatty radical. The fatty radicals may be saturated or unsaturated, linear or also branched; the following fatty acids be mentioned as examples: lauric acid, myristic acid, palmitic acid, stearic acid, oleic acid, arachic acid and behenic acid; as fatty acid mono- or dialkanolamides there may for instance be mentioned the mono- or dialkanolamides of the above mentioned acids; as fatty amines and fatty alcohols there may be mentioned the derivatives of the respective mentioned fatty acids respectively their amides, and also synthesis alcohols (e.g. tetramethylnonanol) and branched aliphatic amines. As partial esters of the mentioned polyols there be mentioned e.g. the mono- or di-fatty acid esters of glycerine, erythritol, sorbitol or sorbitan, in particular the sorbitan mono- or di-oleates or -stearates. As starting products there may e.g. be employed also technical mixtures, e.g. tallow fatty acid, technical sojabean oil acid, technical oleic acid or coconut fatty acid and their hydrogenation and-/or distillation products, as well as the mono- or dialkanol amides, alcohols, amines and polyol partial esters derived therefrom. Of the mentioned products the oxyalkylated fatty alcohols and the oxyalkylated fatty amines are preferred. Among the mentioned surfactants (B$_1$) are preferred those in which the fatty radicals contain in each case 14 to 20, principally 16 to 18 carbon atoms. The oxyethylation products are advantageously addition products of 2 to 25, preferably 2 to 15, in particular 3 to 12 mols of ethylene oxide to 1 mol of starting product (fatty acid, fatty alcohol, fatty amine, fatty acid monoof dialkanol amide or polyol partial ester).

The surfactants (B$_2$) have clearly cationic character and are in particular stronger cationic then any weakly cationactive dispersants (B$_1$). They thus exhibit essentially a higher charge density and/or polarity, i.e. they are less or not oxyalkylated and/or contain more than one cationactive (i.e. basic, protonated and/or quaternized) nitrogen per each fatty radical and/or are at least partially quaternated. As radicals R$_1$—CO— and R$_2$ come into consideration advantageously such with 12 to 24, preferably 14 to 20 carbon atoms, mainly as described above for (B$_1$).

Y stands advantageously for ethylene or propylene-1,2.

Z stands advantageously for methylene, ethylene or propylene-1,2.

The radical X may represent any aliphatic radical with 2 to 6 carbon atoms as they occur in aliphatic di- and polyamines, in particular ethylene, propylene, butylene or hexamethylene, among which ethylene and propylene-1,3 are preferred.

As $C_{1-4}$-alkyl radical in the significances of R$_3$, R$_4$ and R$_5$ come in general into consideration any such alkyl radicals as can be introduced into the molecule by alkylation resp. quaternization, preferably methyl or ethyl.

A$^-$ is an equivalent of a counterion to the respective cationic charges occurring in formula (I), principally such an anion as is formed by quaternization for the introduction of the respective radicals and/or as may be introduced by protonation or ion exchange, e.g. for halide (preferably chloride), sulphate, methosulfate, ethosulphate, rosylate or the anion of a low molecular aliphatic carboxylic acid (in particular with 1 to 4 carbon atoms, e.g. formate, acetate, propionate, lactate, tartrate, oxalate or citrate).

Advantageously (B$_2$) is a surfactant or mixture of surfactants that is at least partially quaternated, i.e. in which in at least a part of the compounds at least one index p=1. Preferably (B$_2$) is a mixture of (B$_{21}$) at least one compound of formula (I) in which $\Sigma p=0$, and (B$_{22}$) at least one compound of formula (I) in which $\Sigma p \geq 1$, R$_3$ signifies $C_{1-4}$-alkyl, benzyl, —Z—CO—NH$_2$ or —Y—OH and, if R" signifies R$_5$, R$_5$ stands for $C_{1-4}$-alkyl, benzyl, —Y—OH or —Z—CO—NH$_2$, and wherein, referred to the total of the fatty radicals R$_1$ and R$_2$, there are 0.5 to 2 quaternary groups of the formula

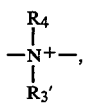  ($\gamma$)

in which R$_3'$ signifies $C_{1-4}$-alkyl, benzyl, —Y—OH or —Z—CO—NH$_2$ per each fatty radical.

The compounds of formula (I) are known compounds or may be produced analogously to known methods. The compounds of formula (I) in which at least one of R$_3$ and R" has a significance other than hydrogen may in particular be produced by introducing a radical R" other than hydrogen resp. at least one radical R$_3$ other than hydrogen and Σp groups $R_4$ into at least one compound of formula

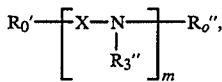

wherein $R_o'$ signifies a radical of formula (α) or $R_2$—N($R_3''$)—,
  $R_o''$ signifies $R_5''$ or —X—$R_o'$,
  $R_3''$ signifies hydrogen, —Y—OH or $C_{1-4}$-alkyl
  and $R_5''$ signifies hydrogen, —Y—OH or $C_{1-4}$-alkyl,
with the proviso that at least one of $R_3''$ and $R_o''$ stands for hydrogen. Σp represents the total of the radicals $R_4$ present in formula (I).

The compounds of formula (Ia), in which $R_o'$ signifies a radical of formula (α) may be produced by acylating at least one amine of formula

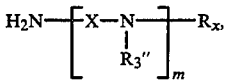

in which $R_x$ signifies $R_5$, —X—N($R_3''$)$R_2$ or —X—N($R_3''$)H, with the proviso that $R_5$ does not signify hydrogen,
with at least one acid $R_1$-COOH or a functional derivative thereof, e.g. the chloride.

For the production of the compounds ($B_{22}$) compounds of the kind ($B_{21}$) are expediently quaternized with $R_4$-yielding compounds.

Among the surfactants ($B_2$) are preferred especially those in which $R'$ stands for a radical of formula (α) and $R''$ signifies $R_5$ and particularly those in which m=1.

The preferred quaternated aminoamides ($B_{22}$), in which $R'$ signifies a radical of formula (α), m=1 and $R''$ signifies $R_5$, and in which $R_3$ signifies $C_{1-4}$-alkyl or —Y—OH, $R_4$ signifies $C_{1-4}$-alkyl or benzyl and $R_5$ signifies $C_{1-4}$-alkyl, benzyl or —Y—OH, may e.g. be produced as described in the above-mentioned German laid-open Patent Application DE 36 21 345 A1.

Σp is preferably not greater than 2 and with particular preference=1.

Advantageously at least a part of the basic amino groups occurring in (B) are protonated.

The weight ratio ($B_1$)/($B_2$) is advantageously in the range of 6/1 to ⅓, preferably 4/1 to 1/1.

The weight ratio ($B_{21}$)/($B_{22}$) is advantageously in the range of 1/5 to 4/1, principally ¼ to 4/1, preferably ⅓ to 2/1.

The weight ratio of the total dispersing agents (B) to the total of the waxes (A) is expediently chosen so that there is formed an aqueous dispersion of fine particle size. Advantageously the weight ratio (B)/(A) is in the range of 1/10 to 6/10, preferably 2/10 to 5/10.

The surfactants (B) may be employed in the form of pure or technical compounds and may optionally contain solvents (in particular solvents miscible with water) and/or catalysts from their production [e.g. for ($B_{22}$) from the quaternization].

The aqueous wax dispersions (G) of the invention may optionally contain further additions, in particular
  (C) at least one softening and/or antistatic adjuvant and/or
  (D) a preserving agent or/and a defoamer.

As antistatic agents and/or softeners (C) come in general into consideration conventional substances as are employed for this in the textile industry, in particular optionally quaternated amino derivatives that contain at least one lipophilic radical and optionally an ester or amide group and which may optionally be sulphomethylated and/or carboxymethylated. Compounds of the kind (C) especially worth mention are reaction products of fatty acids, e.g. such as described above, with alkylenediamines or dialkylenetriamines or also with alkanolamines or alkanolaminoalkylamines, in particular with β-(β'-hydroxyethylamino)-ethylamine, preferably in the molar ratio 1/1 to 2/1.

As (D) come into consideration as preserving agents in particular fungicides and bactericides, principally such as conventionally employed in aqueous wax compositions or finishing agents. As defoamers come principally into consideration silicone-based defoamers.

The aqueous wax dispersions (G) of the invention are preferably substantially free of other waxes than those mentioned above.

Optionally the aqueous wax dispersions (G) of the invention may additionally contain
  (E) at least one amphoteric surfactant.

As amphoteric surfactants (E) come in particular into consideration anionic modifications of cationic surfactants, principally of those of the kind of the surfactants ($B_2$), preferably ($B_{21}$). Especially worth mention are anionic modifications of compounds of formula (Ia'), i.e. of formula (Ia), in which, however, at least one of $R_3''$ and $R_o''$ stands for —Y—OH and the symbols $R_3''$ and $R_5''$ may optionally all be≠H. The anionic modification may take place in a manner known per se, e.g. by esterifying alcoholic hydroxy groups by introduction of a mineral acid radical, in particular a sulphato or phosphato group or by monoacylation with an aliphatic dicarboxylic acid (e.g. $C_{3-8}$) or by anionically modifying compounds of formula (Ia) or (Ia') that contain at least one reactive hydrogen (—OH or =NH) by introduction of a sulphoalkyl or carboxyalkyl radical (e.g. sulfomethyl—, —ethyl or —propyl, carboxymethyl, —ethyl or —propyl) or stepwise by reaction first with epichlorohydrine and then with sulphite (e.g. sodium bisulfite or $SO_2$) or by esterification, analogously as described above.

The preferred amount of (E) is mainly dependent on the cationicity and amount of cationactive components, essentially (B) and (C). If (E) is employed, the weight ratio (E)/[(B)+(C)] is advantageously in the range of 2/100 to 120/100, preferably 10/100 to 100/100.

The above-mentioned surfactants are sufficient and optimally suited in order to produce dispersions (G) of excellent stability and activity and the presence of other surfactants is not necessary and in particular also not desired.

Component (D), if added, is expediently employed in an amount as small as possible, principally in an amount<1%, preferably<0.5%, referred to the total dispersion (G), with particular preference in an amount<1% referred to the total of waxes (A).

The aqueous wax dispersions (G) of the invention may be in general in any desired concentration as suitable for their handling; advantageously the aqueous wax dispersions (G) have a dry substance content of 5 to 60% by weight, preferably 10 to 50% by weight.

The pH of the aqueous dispersions (G) is advantageously in the range of 3 to 7, preferably 3.5 to 6.5.

The aqueous dispersions (G) can be produced in a simple way, e.g. by admixing of the respective dispersed components or by mixing the molten components with water, in particular by mixing with water the mixed molten components ($A_1$) and ($A_2$) and (B) and, if required, adjusting the pH to the desired value, suitably by acid addition.

If the aqueous wax dispersion (G) contains also a wax ($A_3$) this is advantageously melted together with ($A_1$), ($A_2$) and (B), and the mixture is mixed with water, upon which, if required, the pH is adjusted. For the adjustment of the pH are suitable in general conventional acids, e.g. mineral acids (sulphuric acid, phosphoric acid or hydrochloric acid) or low molecular aliphatic carboxylic acid, e.g. with 1 to 4 carbon atoms (e.g. formic acid, acetic acid, propionic acid, tartaric acid, lactic acid, oxalic acid or citric acid).

If the aqueous wax dispersion (G) is to contain also a wax ($A_4$) this is advantageously added subsequently, i.e. when ($A_1$) and ($A_2$) and, if present, also ($A_3$), are already present in dispersed form. Preferably ($A_4$) is added in the form of an aqueous dispersion which is dispersed with the aid of a surfactant of the kind ($B_{22}$) and optionally contains a small amount of wax ($A_2$) or/and optionally a part of the wax ($A_3$); such dispersions are described in the German laid-open Patent Application DE 36 21 345 A1.

If the wax dispersions (G) of the invention are to contain also a component (C) as softener resp. antistatic agent this is advantageously added only when at least so much water has been added that the waxes ($A_1$) and ($A_2$) and, if present, also ($A_3$) are already in dispersed form.

In this regard it is to be noted that the definition of the antistatic agents resp. softeners (C) may in part overlap with the definitions of the surfactants ($B_2$) or, optionally, also ($B_1$), but the dispersing activity of (B) in particular for the production of fine and stable dispersions is especially then of bearing if (B) is melted together with ($A_1$) and ($A_2$) and, if present, also with ($A_3$), so that with water and optionally acid there is formed an aqueous dispersion of fine particle size; the softening activity resp. the antistatic activity of (C) is, on the contrary, of bearing essentially then if (C) is added only after completion of the dispersion of (A).

The waxes ($A_1$) and ($A_2$) and, if present, also ($A_3$) are expediently melted to such a temperature that corresponds at least to the melting range of the highest melting wax; the surfactants (B) are expediently mixed with the melted waxes ($A_1$) and ($A_2$) resp. ($A_3$); the dilution with water takes place advantageously by pouring the melt into hot water (advantageously at a temperature as close as possible to that of the melt, in particular in the range of 80° to 100° C., preferably 85° to 98° C.), any remaining (A)-components, in particular ($A_4$)-dispersions, are advantageously given also into the hot water resp. into the still hot dispersion. Upon completion of the dispersion in the warmth the obtained dispersion may be cooled in a suitable way according to methods known per se, e.g. by external cooling and/or inner cooling (e.g. by addition of ice). If a component (C), (D) or/and (E) is added, this may also be given into the already cooled dispersion. An acid for pH adjustment may be added, e.g. before and/or after the wax addition.

The employed quantity of (C) may vary broadly, depending on the desired respective soft handle or desired antistatic effect. The weight ratio (C)/(A) is advantageously in the range of 0 to 50/100, preferably 0 to 30/100. Particularly pronounced influences of the soft handle are achieved e.g. at weight ratios (C)/(A) in the range of 1/20 to ½, in particular 1/10 to 3/10. Since, however, the wax dispersions of the invention confer already even without the addition of (C) a pleasant soft handle to the substrate, it is possible to obtain even without (C) or with only minimal proportions of (C) very pleasant and efficient finishings.

(E) may be added at any desired time before or/and after the dispersing of (A). Advantageously (E) is added only when the waxes ($A_1$) and ($A_2$) and, if present, also ($A_3$) and optionally ($A_4$), are dispersed in water with the aid of (B).

There may be produced very stable and fine dispersions (G), in particular such in which the diameter of the dispersed particles (A) is <10 μm, mainly is in the range of 0.1 to 5.0 μm, advantageously where a substantial proportion (advantageously at least 30% by weight, preferably at least 50% by weight) of the dispersed particles displays a diameter in the range of 0.5 to 5 μm. The dispersions (G) are stable to storage and may be directly employed for use; they are readily dilutable with water. The (E)-containing dispersions (G) are particularly distinguished by their high indifference to anionic components or impurities of the liquors, e.g. from a preceding treatment of the substrate.

The wax dispersions (G) of the invention serve as finishing agents, specifically as fibre finish in order to increase the slippage properties of the dry or nearly dry spun material and in particular of the yarns that consist of such fibres, as well to each other as to parts of the apparatus used in their processing. For finishing the fibres may be in any form as occurring before or after spinning and as conventionally employed for lubricating, e.g. as spun fibre (flock, carding, spun cable) as single or multiple yarns (also twists) and optionally as fabric produced therefrom (weavings, knittings, fleeces, half-ready made or ready-made goods). With particular preference the dispersions (G) of the invention are employed for the finishing of yarns, in particular of single yarns or multiple twisted yarns (before all as yarn-lubricating finish) in order to facilitate their further processing after spinning, in particular before and during the mechanical essentially dry processing on, e.g. in winding, weaving, knitting or mechanical embroidering. The fibres may consist of any conventional materials as occur in textile industry, in particular in spinning mills, e.g. fibres of vegetable or animal origin, in particular optionally modified cellulose (cotton, linen, viskose rayon, hemp, ramier, oakum), natural or synthetic polyamides (optionally antifelt treated—e.g. hercoset—wool, cotton, synthetic polyamides), polyesters, polyurethanes, polyacrylonitril (cationically or anionically modified) and polyolefin fibres. Synthetic fibres may also be texturized and/or be in the form of microfibres.

The wax dispersions (G) of the invention may be applied to the substrates by any conventional methods, e.g. by impregnation procedures (e.g. by dipping, padding, roller application, spraying) or by exhaust procedures. For the exhaust procedure the liquor-to-goods ratios may be various as suitable for the procedure, e.g. from 1:1 to 120:1, in particular 5:1 to 60:1; the exhaust procedure takes place advantageously at temperatures $\leq 80°$ C., preferably in the range of 25 to 75, in particular 30° to 50° C.; the pH of the treatment liquor is advantageously in the range of 4 to 8, preferably 5 to 7, and may be adjusted, if required, by addition of suitable conventional acids and/or buffers, e.g. by addition of low molecular carboxylic acids (for instance as mentioned above) or of buffers (for instance sodium hydrogen phosphate or ammonium sulphate). The wax dispersions (G) of the invention may, if desired, be pre-diluted to stock dispersions before the formulation of application liquors or may also be directly metered into the liquors. They are advantageously employed in such amounts that correspond to a concentration of 0.1 to 5%, preferably 0.2 to 1.2% of wax mixture (A), referred to the weight of the dry substrate. The finishing with (G) according to the invention may advantageously directly follow a preceding treatment, e.g. a dyeing, optical brightening and/or bleaching, viz. even without intermediate drying. The substrate may be treated with the dispersions (G) of the invention, in particular in the form of bobbins (e.g. cross-wound bobbins) of skeins or hanks or also in continuous line (e.g. in a yarn-drawing-in machine, over a godet roll or a kiss roll or in a yarn spray-dyeing machine). The treated goods may be dried by conventional methods, e.g. with hot air, advantageously at temperatures >98° C., preferably at temperatures in the range of 100° to 130° C., in particular 102° to 120° C., optionally in the presence of steam, or with high-frequency waves (radio-waves) or further by IR-irradiation.

By the finishing with (G) according to the invention the dynamic friction of the finished goods is substantially reduced whereas the static friction of the fibres remains at a high level, so that there may be obtained treated fibres, in particular finished fibres of optimum slippage and structural stability that are excellently suitable for the mechanical dry further processing, in particular for winding, weaving and knitting and also for the mechanical embroidering, whereby the soft handle may also be improved. The finishing of the invention is in particular also stable to various mechanical and thermal strains, to which the finished yarns are subjected, e.g. attrition of the yarns to various parts of the machine (e.g. yarn guide rings or rolls or further yarn guide systems) or yarn to yarn (e.g. in winding, rewinding, package-winding, knitting, weaving or mechanical embroidering), tensions, vibrations or flexions in the various yarns paths and at various speeds and also temperature modifications or variations in various compartments or portions of the apparatus. The efficiency of the employed apparatus may be optimally exploited. The textile material produced with the treated yarns, in particular weavings and knittings, due to the finishing of the yarns for their production, are also provided with an improved slippage, so that their mechanical processability, in particular sewability, is also correspondingly improved. The finishing of the invention is distinguished by its mechanical and thermal permanence and may, however, also be practically completely washed out by means of a few washing cycles, if desired. The finishing of the invention is compatible with other finishing agents based on waxes dispersed with the aid of non-ionic and/or cationactive surfactants, and the goods produced with yarns finished according to the invention may, if desired, be further finished with such other wax dispersions, without having to eliminate the finishing of the invention. Examples of such particularly suitable wax dispersions are those described in German laid-open Patent Applications DE 36 21 345 A1, DE 30 03 851 A1 and DE 35 19 337 A1. The dyeing properties and physical properties of the substrates are practically not impaired.

In the following examples the parts are parts by weight and the percentages are percentages by weight, the temperatures are indicated in degrees Celsius.

The dynamic friction of the yarns finished in the application examples is determined on a ROTSCHILD F-Meter L-1188 (electronic measuring instrument for the automatic measurement of the friction coefficient); the calculation of the friction coefficient is obtained by means of the Eytelwein formula:

$$\frac{S_2}{S_1} = e^{\mu \cdot \alpha}$$

in which $S_1$ is the yarn tension before the friction point,
$S_2$ is the yarn tension after the friction point,
$\alpha$ is the deviation of the yarn from the initial direction indicated in angular degrees
and $\mu$ is the dynamic friction coefficient.

The dispersion components (A), (B), (C) and (E) employed in the examples are as follows:

Waxes ($A_1$), ($A_2$), ($A_3$) and ($A_4$)

($A_{11}$) Hard paraffin with melting range 90°–95° C. and needle penetration by ASTM-D 1321=7 to 11 dmm;

($A_{12}$) Hard paraffin with melting range 88°–93° C. and needle penetration by ASTM-D 1321=10 to 15 dmm;

($A_{21}$) Partially saponified Fischer-Tropsch wax with melting range pb 105°–115° C. and needle penetration by ASTM-D 1321=2 to 3 dmm, acid number 10–14 and saponification number 22–23;

($A_{22}$) Oxidized polyethylene, partially saponified, with melting range 103°–108° C., needle penetration by ASTM-D 1321=1 to 3 dmm, acid number 22–26 and saponification number 47–52;

($A_{23}$) Oxidized polyethylene with melting range 102°–106° C., needle penetration by ASTM-D 1321=2 dmm, acid number 15 and saponification number 24–26;

($A_{24}$) Oxidized microwax with melting range 95°–98° C., needle penetration by ASTM-D 1321=2 dmm, acid number 12.5 and saponification number 30;

($A_{31}$) Paraffin fully refined with melting range 54°–56° C. and needle penetration by ASTM-D 1321=13 dmm;

($A_{41}$) Oxidized polyethylene with dripping point 103° C., acid number 25 and density at 20° C.=0.96, reacted with the stoichiometric quantity (referred to the acid number) of dimethylaminopropylamine for amidation and dimethylsulphate for quaternization.

Surfactants ($B_1$), ($B_{21}$) and ($B_{22}$)

($B_{11}$) Addition product of 5 mols of ethylene oxide to 1 mol of oleyl alcohol;

($B_{12}$) Addition product of 10 mols of ethylene oxide to 1 mol of oleyl alcohol;

($B_{211}$) Cationactive surfactant of the formula

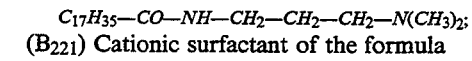
$C_{17}H_{35}-CO-NH-CH_2-CH_2-CH_2-N(CH_3)_2$;

($B_{221}$) Cationic surfactant of the formula

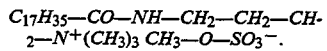
$C_{17}H_{35}-CO-NH-CH_2-CH_2-CH_2-N^+(CH_3)_3\ CH_3-O-SO_3^-$.

Assistants (C)

(C₁) Condensation product of 1.7 mols of stearic acid and 1 mol of N-(β-hydroxyethyl)-ethylene diamine, protonated with acetic acid.

Surfactants (E)

(E₁) Amphoteric surfactant of the formula

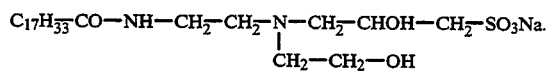

Dispersion J

Aqueous dispersion consisting of
10% paraffin ($A_{31}$)
10% wax ($A_{41}$)
5% dispersant
Balance: water.

EXAMPLE 1

375.0 parts of paraffin wax ($A_{31}$), 225.0 parts of emulsifier ($B_{11}$), 375.0 parts of paraffin wax ($A_{11}$) and 187.5 parts of synthesis wax ($A_{21}$) are melted at 105°–110° C. and additioned with 45 parts of dispersant ($B_{211}$). To the obtained melt are added 67.9 parts of dispersant ($B_{221}$) dissolved in 29.1 parts of 1,2-propyleneglycol (from the quaternization). The resulting clear mixture is now heated to 110°–115° C. and poured into 1595.0 parts of demineralized water of 95° C. to which there had been added 7.5 parts of glacial acetic acid. 750.0 parts of ice are then added and the mixture is cooled down to room temperature. At room temperature there are further added 731.4 parts of a 25% aqueous dispersion of ($C_1$). There is obtained a dispersion ($G_1$) with very good yarn slippage finish properires.

EXAMPLE 2

The procedure is carried out as in Example 1, with the difference that instead of the wax ($A_{11}$) there is employed the same quantity of wax ($A_{12}$). There is obtained a dispersion ($G_2$) with very good yarn slippage finish properites.

EXAMPLE 3

The procedure is carried out as in Example 1, with the difference that instead of the wax ($A_{21}$) there is employed the same amount of wax ($A_{22}$). There is obtained a dispersion ($G_3$) with very good yarn slippage finish properties.

EXAMPLE 4

The procedure is carried out as in Example 1, with the difference that instead of the wax ($A_{21}$) there is employed the same amount of wax ($A_{23}$).
There is obtained a dispersion ($G_4$) with very good yarn slippage finish properties.

EXAMPLE 5

The procedure is carried out as in Example 1, with the difference that instead of the wax ($A_{21}$) there is employed the same amount of wax ($A_{24}$). There is obtained a dispersion ($G_5$) with very good yarn slippage finish properties.

EXAMPLE 6

375 parts of paraffin wax ($A_{31}$), 225.0 parts of emulsifier ($B_{11}$), 375.0 parts of paraffin wax ($A_{12}$) and 187.5 parts of synthesis wax ($A_{21}$) are melted at 105°–110° C. and mixed with 45.0 parts of dispersant ($B_{211}$). 67.7 parts of dispersant ($B_{221}$) dissolved in 29.1 parts of 1,2-propyleneglycol (from the quaternization) are now further added to the melt and the resulting clear melt of 110°–115° C. is allowed to flow into 1597.5 parts of demineralized water of 95° C. To the formed dispersion are now added 187.5 parts of an aqueous dispersion (J) and the cooling is switched on. At 85° C. there are added 7.5 parts of glacial acetic acid and 562.5 parts of ice and cooling is continued down to room temperature. At room temperature there are further added 731.9 parts of a 25% aqueous dispersion of ($C_1$). There is obtained a very fine dispersion ($G_6$) with very good yarn slippage finish properties.

EXAMPLE 7

375 parts of paraffin wax ($A_{31}$), 225.0 parts of emulsifier ($B_{11}$), 375.0 parts of paraffin wax ($A_{12}$) and 187.5 parts of synthesis wax ($A_{21}$) are melted at 105°–110° C. and mixed with 45.0 parts of dispersant ($B_{211}$). To the melt are now further added 67.7 parts of dispersant ($B_{221}$) dissolved in 29.1 parts of 1,2-propyleneglycol (from the quaternization) and the obtained clear melt of 110°–115° C. is allowed to flow into 1597.5 parts of demineralized water of 95° C. To the resulting dispersion are now added 7.5 parts of glacial acetic acid and then 750 parts of dispersion (J); the cooling is now switched on and there is cooled down to room temperature. At room temperature there are further added 731.9 parts of a 25% aqueous dispersion of ($C_1$). There is obtained a very fine dispersion ($G_7$) with very good yarn slippage finish properties.

EXAMPLE 8

The procedure is carried out as described in Example 6, with the difference that 263.5 parts of a 50% aqueous dilution of ($E_1$) are stirred at room temperature into the dispersion ($G_6$). There is obtained a very fine dispersion ($G_8$) with very good yarn slippage finish properties.

EXAMPLE 9

375 parts of paraffin wax ($A_{31}$), 225.0 parts of emulsifier ($B_{11}$), 22.5 parts of emulsifier ($B_{12}$), 375.0 parts of paraffin wax ($A_{12}$) and 187.5 parts of synthesis wax ($A_{21}$) are melted at 105°–110° C. and mixed with 45.0 parts of dispersant ($B_{211}$). 67.7 parts of dispersant ($B_{221}$) dissolved in 29.1 parts of 1,2-propyleneglycol (from the quaternization) are now added to the melt and the resulting clear melt of 110°–115° C. is allowed to flow into 1597.5 parts of demineralized water of 95° C. To the resulting dispersion are now added 187.5 parts of dispersion (J) and the cooling is switched on. 7.5 parts of glacial acetic acid and 562.5 parts of ice are added at 85° C. and cooling is continued down to room temperature. At room temperature there are further added 73.5 parts of a 25% aqueous dispersion of ($C_1$). There is obtained a very fine dispersion ($G_9$) with very good yarn slippage finish properties.

EXAMPLE 10

375 parts of paraffin wax ($A_{31}$), 225.0 parts of emulsifier ($B_{11}$), 22.5 parts of emulsifier ($B_{12}$), 375.0 parts of paraffin wax ($A_{12}$) and 187.5 parts of synthesis wax ($A_{21}$) are melted at 105°–110° C. and mixed with 67.7 parts of dispersant ($B_{211}$). To the melt are now further added 67.7 parts of dispersant ($B_{221}$) dissolved in 29.1 parts of 1,2-propyleneglycol (from the quaternization) and the resulting clear melt of 110°–115° C. is allowed to flow into 1597.5 parts of demineralized water of 95° C. To the resulting dispersion are now added 187.5 parts of dispersion (J) and the cooling is switched on. At 95° to 85° C. there are added 11.1 parts of glacial acetic acid, 562.5 parts of ice and 340 parts of demineralized cold water and cooling is continued down to room temperature. At room temperature there are added 10.2 parts of a 25% aqueous dispersion of ($C_1$) and 8 parts of a silicone defoamer. There is obtained a very fine dispersion ($G_{10}$) with very good yarn slippage finish properties.

EXAMPLE 11

375 parts of paraffin wax ($A_{31}$), 225.0 parts of emulsifier ($B_{11}$), 22.5 parts of emulsifier ($B_{12}$), 375.0 parts of paraffin wax ($A_{12}$) and 187.5 parts of synthesis wax ($A_{21}$) are melted at 105°–110° C. and mixed with 67.7 parts of dispersant ($B_{211}$). To the melt are now further added 67.7 parts of dispersant ($B_{221}$) dissolved in 29.1 parts of 1,2-propyleneglycol (from the quaternization) and the resulting clear melt of 110°–115° C. is allowed to flow into 1597.5 parts of demineralized water of 95° C. To the resulting dispersion are now added 375 parts of dispersion (J) and the cooling is switched on. At 95° to 85° C. there are added 11.1 parts of glacial acetic acid, 562.5 parts of ice and 183 parts of demineralized cold water and cooling is continued down to room temperature. At room temperature there are added 10.2 parts of a 25% aqueous dispersion of ($C_1$) and 8 parts of a silicone defoamer. There is obtained a very fine dispersion ($G_{11}$) with very good yarn slippage finish properties.

Examples 12 to 22

The procedure is carried out as described in each of Examples 1 to 11 with the difference that no assistant ($C_1$) is added. There are obtained the respective dispersions ($G_{12}$), ($G_{13}$), ($G_{14}$), ($G_{15}$), ($G_{16}$), ($G_{17}$), ($G_{18}$), ($G_{19}$), ($G_{20}$), ($G_{21}$) and ($G_{22}$) with very good yarn slippage finishing properties.

Application Example A

In a machine for the dyeing of cross-wound bobbins a cross-wound bobbin of 100%, bleached, double-twisted cotton yarn with an English number Ne of 30 is treated by the exhaust method at a liquor-to-goods ratio of 15:1 with 1.5% and 3.0% of the dispersion ($G_1$), obtained according to Example 1, during 30 minutes, at 40° C. and pH 5 (adjusted with acetic acid). Then the liquor is drained off and the bobbin is dried at 102° C. The friction coefficients of the yarns are measured in the Rothschild F-meter L-1188 and are as follows:

The non-finished yarn gives, with an initial tension of 10 cN, a deviation angle 180° and a speed of 50 m/min, a friction coefficient $\mu$ of 0.7 to 0.8.

The finished yarns give, with an initial tension of 10 cN, a deviation angle of 180° and a speed of 100 m/min, a friction coefficient $\mu < 0.2$.

Application Example B

The procedure is carried out as described in Application Example A, with the difference that in place of a cross-wound bobbin in a dyeing machine for the dyeing of cross-wound bobbins a cotton skein of 100%, bleached, double-twisted cotton yarn with an English number Ne of 30 is finished by the exhaust method with the dispersion ($G_1$) according to Example 1. The friction coefficients $\mu$ measured as in Application Example A are for the finished material $<0.2$.

Application Examples A2 to A22 and B2 to B22

The procedures are carried out as described in Application Examples A and B, with the difference that in place of dispersion ($G_1$) according to Example 1 there are employed the dispersions ($G_2$), ($G_3$), ($G_4$), ($G_5$), ($G_6$), ($G_7$), ($G_8$), ($G_9$), ($G_{10}$), ($G_{11}$), ($G_{12}$), ($G_{13}$), ($G_{14}$), ($G_{15}$), ($G_{16}$), ($G_{17}$), ($G_{18}$), ($G_{19}$), ($G_{20}$), ($G_{21}$) and ($G_{22}$) according to each of the Examples 2, 3, 4, 5, 6, 7, 8, 9, 10, 11, 12, 13, 14, 15, 16, 17, 18, 19, 20, 21 and 22.

The friction coefficients U are, with an initial tension of 10 cN, a deviation angle of 180° and a speed of 100 m/min, $<0.2$.

I claim:

1. An aqueous wax dispersion (G) comprising: a wax mixture (A) of;
    ($A_1$) at least one non-oxidized microcrystalline wax [($A_1$)] with a needle penetration according to ASTM-D 1321 $<20$ dmm and melting range above 65° C.

and ($A_2$) at least one oxidized hydrocarbon wax [($A_2$)] with a needle penetration according to ASTM-D 1321 $<4$ dmm and, optionally at least one wax selected from:

($A_3$) at least one non-oxidized paraffin wax having needle penetration according to ASTM-D 1321 $<55$ dmm and melting range not exceeding 65° C., and, ($A_1$) at least one cationically modified oxidized hydrocarbon wax, and, (B) a cationic dispersant composition.

2. An aqueous wax dispersion (G) according to claim 1, wherein the at least one non-oxidized microcrystalline wax ($A_1$) has a melting range within the range of 80° to 105° C. and a needle penetration according to ASTM-D 1321 in the range of 5 to 16 dmm.

3. An aqueous wax dispersion (G) according to claim 1, wherein the weight ratio ($A_2$)/($A_1$) is from 1/10 to 1/1.5.

4. An aqueous wax dispersion (G) according to claim 1, wherein the at least one cationically modified oxidized hydrocarbon wax ($A_4$) is a Fischer-Tropsch wax or an oxidized polyethylene wax or an oxidized microwax, which wax has a needle penetration according to ASTM-D 1321 of $\leq 20$ dmm, a dripping point $\geq 80°$ C. an acid number in the range of 5 to 80, that has been cationically modified by amidation with a polyamine containing only one primary amino group and quaternized.

5. An aqueous wax dispersion (G) according to claim 1 wherein the weight ratio of ($A_4$)/($A_2$) [($A_4$)/($A_2$)] is $<0.5$.

6. An aqueous wax dispersion (G) according to claim 1, wherein the cationic dispersant composition (B) comprises:
    at least one non-ionic or weakly cationic dispersant ($B_1$), and,
    at least one cationic surfactant ($B_2$) of the formula

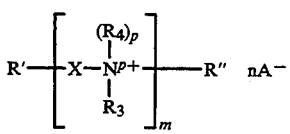

where R' signifies a radical of the formula

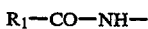

or

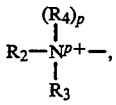

R" signifies $R_5$ or —X—R',
$R_1$—CO— signifies the acyl radical of a $C_{10-24}$-fatty acid,
$R_2$ signifies an aliphatic $C_{10-24}$'hydrocarbon radical,
$R_3$ signifies hydrogen, $C_{1-4}$-alkyl, benzyl, —Y—OH or —Z—CO—$NH_2$,
$R_4$ signifies $C_{1-4}$-alkyl or benzyl,
$R_5$ signifies hydrogen, $C_{1-4}$-alkyl, benzyl, —Y—OH or —Z—CO—$NH_2$,
X signifies $C_{2-6}$-alkylene,
Y signifies $C_{2-4}$-alkylene or styrene,
Z signifies $C_{1-3}$-alkylene,
each of the indexes p, independently from each other, signifies 0 or 1,
m signifies a number from 0 to 2 if R' signifies a radical of formula (β), or from 1 to 2 if R' signifies a radical of formula (α),
A- signifies an equivalent of an anion
and n signifies the total number of positive charges in ($B_2$)
and which, if at least one of the indexes p=0, is optionally protonated.

7. An aqueous wax dispersion (G) according to claim 6, wherein ($B_2$) is a mixture of
at least one compound ($B_{21}$) of formula (I), in which Σp=0
and
at least compound ($B_{22}$) of formula (I) in which Σp≧1, $R_3$ signifies $C_{1-4}$alkyl, benzyl, —Z—CO—$NH_2$ or —Y—OH, if R" signifies $R_5$, $R_5$ stands for $C_{1-4}$—alkyl, benzyl, Y—OH or —Z—CO—$NH_2$, and wherein, referred to the total of the fatty radicals $R_1$ and $R_2$, there are 0.5 to 2 quarternary groups of the formula

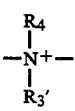

in which $R_3'$ signifies $C_{1-4}$—alkyl, benzyl, —Y—OH or —Z—CO—$NH_2$ per each fatty acid radical.

8. An aqueous wax dispersion (G) according to claim 1, further containing a softening adjuvant.

9. An aqueous wax dispersion (G) according to claim 1, further containing an antistatic adjuvant.

10. An aqueous wax dispersion (G) according to claim 1, further containing a preserving adjuvant.

11. An aqueous wax dispersion (G) according to claim 1, further containing a defoaming adjuvant.

12. An aqueous wax dispersion (G) according to claim 1, further containing at least one amphoteric surfactant.

13. An aqueous wax dispersion (G) according to claim 1 having an aqueous content of 40 to 95% by weight.

14. An aqueous wax dispersion (G) according to claim 1, with a pH of 3 to 7.

15. A process for the production of an aqueous wax dispersion (G) according to claim 1 which includes the steps of:
admixing dispersions of components ($A_1$) and ($A_2$) and (B), and,
optionally further admixing a softening adjuvant, defoaming adjuvant,
a mineral acid or $C_{1-4}$ aliphatic carboxylic acid, an amphoteric surfactant, a preserving agent, or an antistatic agent.

16. A process for the production of an aqueous wax dispersion (G) according to claim 15 which includes the steps of:
admixing dispersions of components ($A_1$), ($A_2$), ($A_3$) and (B),
optionally subsequently admixing ($A_4$) to the admixture,
optionally further admixing a softening adjuvant, defoaming adjuvant,
a mineral acid or $C_{1-4}$ aliphatic carboxylic acid, an amphoteric surfactant, a preserving agent, or an antistatic agent.

17. A process for the production of an aqueous wax dispersion (G) according to claim 1 which includes the steps of:
admixing dispersions of components (A) and ($A_2$) and (B)
subsequently admixing component ($A_4$) to the admixture, and,
optionally further admixing a softening adjuvant, defoaming adjuvant, a mineral acid or $C_{1-4}$ aliphatic carboxylic acid, an amphoteric surfactant, a preserving agent, or an antistatic agent.

18. A process for the production of an aqueous wax dispersion (G) according to claim 1 which includes the steps of:
melting components ($A_1$) and ($A_2$) to form a mixture of molten waxes;
adding (B) to the mixture of molten waxes; and,
optionally further admixing a softening adjuvant, defoaming adjuvant, a mineral acid or $C_{1-4}$ aliphatic carboxylic acid, an amphoteric surfactant, a preserving agent, or an antistatic agent.

19. The process for the production of an aqueous wax dispersion (G) according to claim 1 which includes the steps of:
melting components ($A_1$), ($A_2$) and ($A_3$) to form a mixture of molten waxes;
adding (B) and optionally component ($A_4$) to the mixture of molten waxes; and,
optionally further admixing a softening adjuvant, defoaming adjuvant, a mineral acid or $C_{1-4}$ aliphatic carboxylic acid, an amphoteric surfactant, a preserving agent, or an antistatic agent.

20. The process for the production of an aqueous wax dispersion (G) according to claim 1 which includes the steps off
melting components ($A_1$) and ($A_2$) to form a mixture of molten waxes;

adding (B) and component (A$_4$) to the mixture of molten waxes; and, optionally further admixing a softening adjuvant, defoaming adjuvant, a mineral acid or C$_{1-4}$ aliphatic carboxylic acid, an amphoteric surfactant, a preserving agent, or an antistatic agent 21. A process for the finishing of fibrous material, which includes the step of:
  contacting the fibrous material with a wax dispersion (G) according to claim 1.

22. A process according to claim 21 for the finishing of yarns.

* * * * *

UNITED STATES PATENT AND TRADEMARK OFFICE
CERTIFICATE OF CORRECTION

PATENT NO. : 5,389,136
DATED : February 14, 1995
INVENTOR(S) : Bernard Danner It is certified that error appears in the above-identified patent and that said Letters Patent is hereby corrected as shown below:

Column 16, Claim 1, line 23, delete "[($A_1$)]";

Column 16, Claim 1, line 27, delete "[($A_2$)]";

Column 16, Claim 1, line 36, delete "($A_1$)" and insert therefore -- ($A_4$) --; and Column 16, Claim 5, line 61, delete "[(A4)/A2)]".

Signed and Sealed this

Fourth Day of July, 1995

BRUCE LEHMAN

*Attest:*

*Attesting Officer*       *Commissioner of Patents and Trademarks*